United States Patent
Takeuchi et al.

[11] Patent Number: 5,283,472
[45] Date of Patent: Feb. 1, 1994

[54] CONTROL SYSTEM FOR VEHICLE SAFETY DEVICE

[75] Inventors: Kunihiro Takeuchi; Hideki Ishizuka; Hideyuki Kaneko, all of Saitama, Japan

[73] Assignee: Airbag Systems Company Ltd., Tomioka, Japan

[21] Appl. No.: 651,626

[22] Filed: Feb. 6, 1991

[30] Foreign Application Priority Data

Feb. 23, 1990 [JP] Japan ................. 2-41134

[51] Int. Cl.⁵ .............................. B60R 21/32
[52] U.S. Cl. ..................... 307/10.1; 180/282; 280/735; 340/436
[58] Field of Search ............... 307/10.1, 9.1; 324/727, 324/527; 73/510, 514, 518, 649, 652, 654, 1 D, 1 DV; 340/669, 436, 438, 440; 280/728, 734, 735; 180/271, 274, 282

[56] References Cited

U.S. PATENT DOCUMENTS

| | | | |
|---|---|---|---|
| 4,873,452 | 10/1989 | Morota et al. | 340/436 |
| 4,950,914 | 8/1990 | Kurihara et al. | 307/10.1 |
| 4,958,851 | 9/1990 | Behr et al. | 280/735 |
| 4,984,464 | 1/1991 | Thomas et al. | 280/735 |
| 5,045,835 | 9/1991 | Masegi et al. | 340/438 |
| 5,085,464 | 2/1992 | Behr et al. | 280/735 |
| 5,208,484 | 5/1993 | Okano et al. | 307/10.1 |

Primary Examiner—Howard L. Williams
Assistant Examiner—Richard T. Elms
Attorney, Agent, or Firm—Fish & Richardson

[57] ABSTRACT

A control system for a vehicle safety device includes a drive circuit. The drive circuit includes a main switching element, and a safety switch which is turned on by an inertia force produced at the time of a collision of the vehicle. The vehicle safety device is activated when the main switching element and said safety switch are both turned on. The control system further includes an acceleration sensing circuit for detecting deceleration of the vehicle, and a microcomputer. The microcomputer judges, based on a deceleration signal from the acceleration sensing circuit, whether or not a collision has occurred, and outputs an ON-instruction signal to the main switching element when the microcomputer judges that the collision has occurred. The microcomputer also judges whether or not the acceleration sensing circuit is subjected to a malfunction, and judges whether the safety switch is in the ON state or the OFF state. The microcomputer outputs an ON-instruction signal to the main switching element when the microcomputer judges that the acceleration sensing circuit is subjected to a malfunction and at the same time when the microcomputer judges that the safety switch is in the ON state.

5 Claims, 2 Drawing Sheets

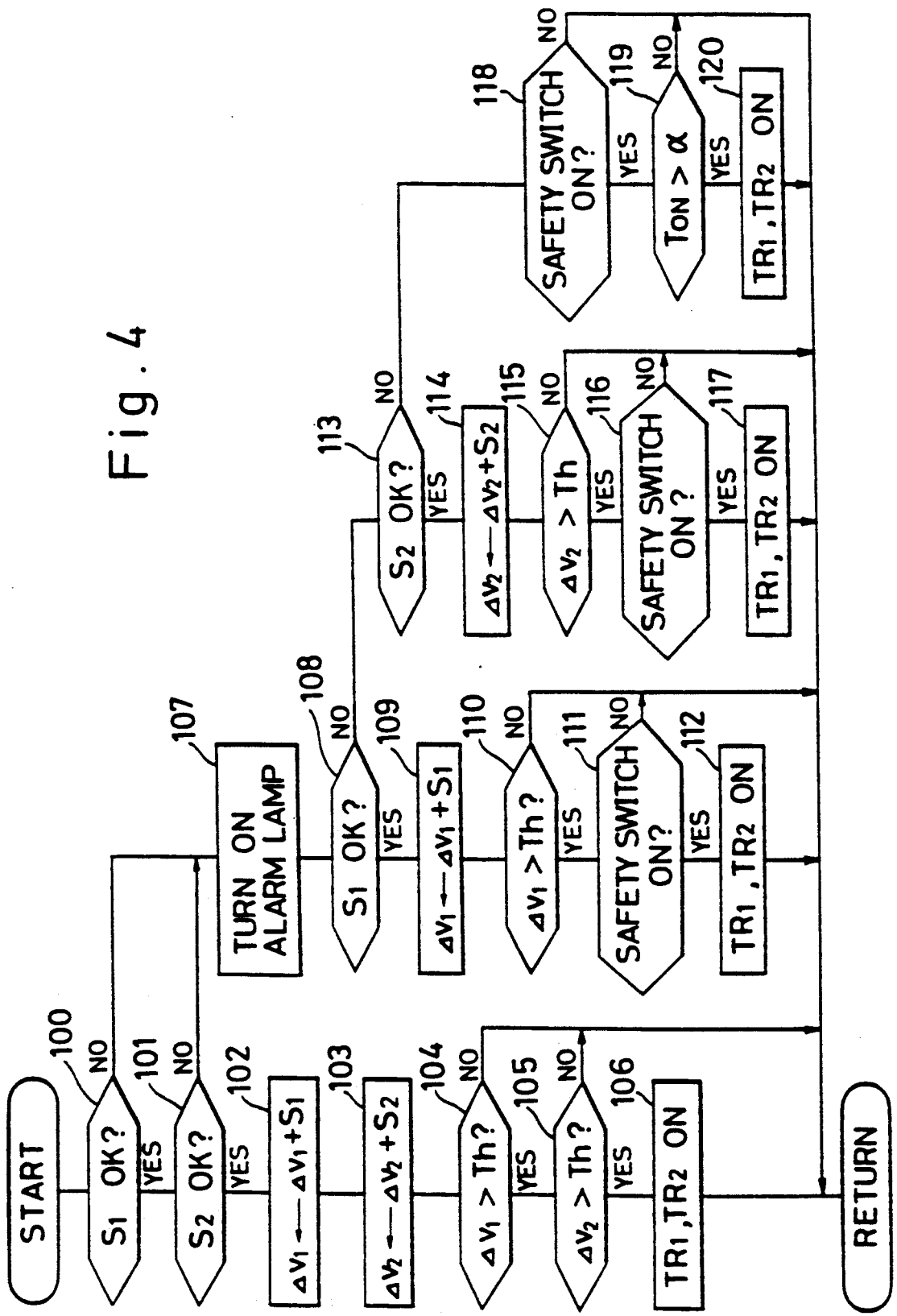

CONTROL SYSTEM FOR VEHICLE SAFETY DEVICE

BACKGROUND OF THE INVENTION

This invention relates to a control system for a vehicle safety device.

A system for controlling a vehicle safety device, such as an air bag, which utilizes a microcomputer, is already known, for example, from Japanese Laid-Open (Kokai) Utility Model Application No. 5371/90. The microcomputer integrates a deceleration signal from an acceleration sensing circuit, and compares this integral value with a threshold level to determine whether or not a vehicle collision has occurred. The microcomputer, when judging that the vehicle collision has occurred, feeds an ON-instruction signal to a transistor of a drive circuit to turn on this transistor, so that a squib connected in series with this transistor is supplied with electric current and is ignited, thereby expanding the air bag so as to ensure the safety of the passenger of the vehicle. Recently, this control system has come into the limelight because of the high-precision collision judgment effected by the microcomputer.

In the above control system, it is necessary to give consideration to a run-away of the microcomputer. When the microcomputer runs away, it is possible that the ON-instruction signal may be outputted despite the fact that a collision has not actually occurred, with the result that the air bag is activated inadvertently.

In the above control system, a safety switch is used as one of means for dealing with the run-away of the microcomputer. This safety switch is turned on by an inertia force produced upon collision of the vehicle, and is connected in series with the above transistor. When an actual collision does not occur, the safety switch is in the OFF state, and therefore even when the transistor is turned on due to a runaway of the microcomputer, electric current is not supplied to the squib, thus preventing an inadvertent activation of the air bag.

In the above control system, when the acceleration sensing circuit is subjected to a malfunction, the ON-instruction signal is not fed from the microcomputer to the transistor. Therefore, when a collision occurs during the malfunction of the acceleration sensing circuit, the transistor remains in the OFF state, though the safety switch is turned on. As a result, the air bag is not activated.

Japanese Laid-Open Patent Application No. 241467/88 (corresponding to U.S. Pat. No. 4,950,914) discloses means for detecting a malfunction of an acceleration sensing circuit. One of the inventors of the present invention is a joint invention of a U.S. patent application filed on Jan. 18, 1991 which is directed to a control system of the type in which a malfunction of an acceleration sensing circuit is detected by a microcomputer.

SUMMARY OF THE INVENTION

It is an object of this invention to provide a control system which can activate a vehicle safety device even when an acceleration sensing circuit is subjected to a malfunction.

According to the present invention, there is provided a control system for a vehicle safety device comprising:

(a) a drive circuit for the vehicle safety device, the drive circuit including main switching means and a safety switch which is turned on by an inertia force produced at the time of a collision of the vehicle, and the vehicle safety device being activated when the main switching means and the safety switch are both turned on;

(b) acceleration sensing means for detecting deceleration of the vehicle; and (c) a microcomputer comprising (i) first ON-instruction signal outputting means for judging, based on a deceleration signal from the acceleration sensing means, whether or not a collision has occurred and for outputting a first ON-instruction signal to the main switching means when the first ON-instruction signal outputting means judges that the collision has occurred; (ii) malfunction judgment means for judging whether or not the acceleration sensing means is subjected to a malfunction; (iii) switch state judgment means for judging whether the safety switch is in the ON state or the OFF state; and (iv) second ON-instruction signal outputting means for outputting a second ON-instruction signal to the main switching means when the malfunction judgment means judges that the acceleration sensing means is subjected to a malfunction and at the same time when the switch state judgment means judges that the safety switch is in the ON state.

BRIEF DESCRIPTION OF THE DRAWINGS

FIG. 4 is a flow chart of a timer interrupt routine executed by a microcomputer.

DESCRIPTION OF THE PREFERRED EMBODIMENTS OF THE INVENTION

Figure 1:
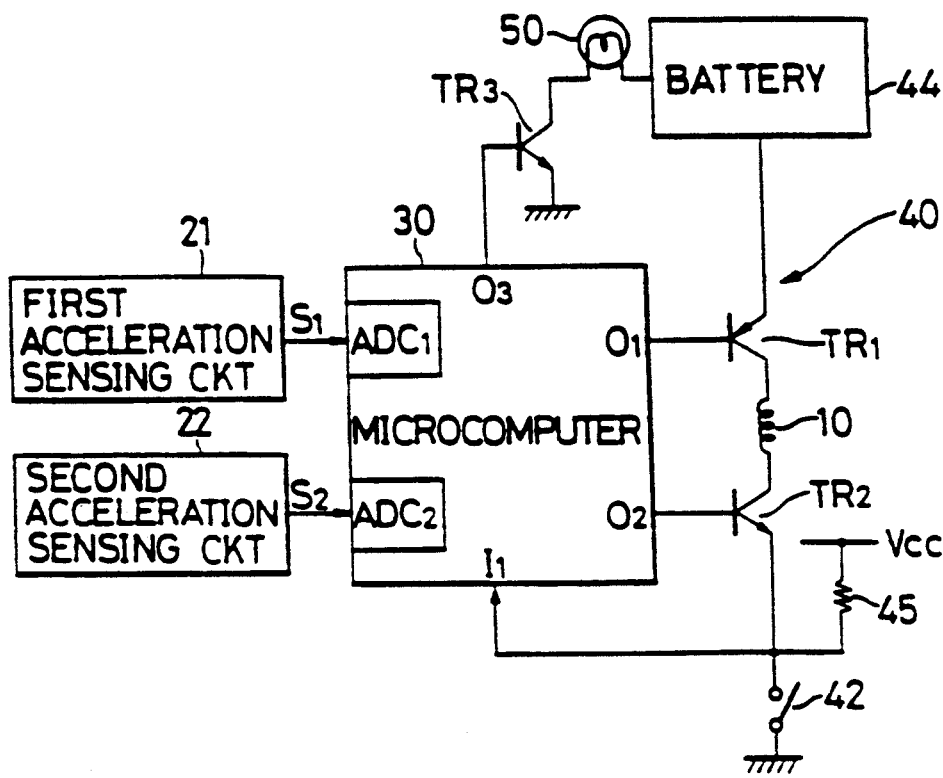
FIG. 1 is a schematic circuit diagram of a preferred embodiment of the present invention.

A preferred embodiment of the invention will now be described with reference to the drawings. FIG. 1 schematically shows a control system for controlling a squib 10 of an air bag (vehicle safety device). The control system comprises a pair of first and second acceleration sensing circuits 21 and 22 for detecting acceleration/deceleration of a vehicle, a microcomputer 30, and a drive circuit 40 for driving the squib 10. Acceleration sensing means is constituted by the first and second acceleration sensing circuits 21 and 22.

Each of the first and second acceleration sensing circuits 21 and 22 includes an acceleration sensor (e.g. piezoelectric element) for outputting a voltage signal corresponding to the acceleration/deceleration, and necessary amplifier circuits. Each of the acceleration sensing circuits 21 and 22 outputs a reference voltage of 2.5 V when the vehicle is stopped or is running at a constant speed (that is, the acceleration is zero). The output voltage of each acceleration sensing circuit 21, 22 is below the above reference voltage in an accelerating condition of the vehicle, and this output voltage is above the reference voltage in a decelerating condition of the vehicle. The upper limit of the output of each acceleration sensing circuit 21, 22 is 5 V, and its lower limit is 0 V. The voltage signals S1 and S2, which are outputted respectively from the two acceleration sensing circuits 21 and 22 and represent the acceleration or deceleration, are sent respectively to a pair of analog-to-digital converters ADC1 and ADC2 (which are contained in the microcomputer 30) where the voltage signals are converted into digital data which are then fed to the microcomputer 30.

The microcomputer 30 has output ports O1, O2 and O3 and an input port I1.

The drive circuit 40 includes first and second transistors TR1 and TR2 and a safety switch 42 which are serially connected in this order from a battery 44 toward the ground. The squib 10 of the air bag is connected between the two transistors TR1 and TR2. Connected between the first transistor TR1 and the battery 44 are an energy reservoir (not shown) in the form of a capacitor of a large capacity and a booster circuit (not shown) for increasing the output voltage of the energy reservoir to a level higher than a voltage of a power source. The energy reservoir and the booster circuit are arranged in this order from the first transistor TR1 toward the battery 44. Only when the two transistors TR1 and TR2 and the safety switch 42 are all turned on, the squib 10 is supplied with electric current from the energy reservoir to be ignited, thereby effecting the expansion of the air bag.

The first transistor TR1 is of the PNP type, and the second transistor TR2 is of the NPN type. The two transistors TR1 and TR2 constitute main switching means. The bases of the transistors TR1 and TR2 are connected to the output ports O1 and O2 of the microcomputer 30, respectively.

One terminal of the safety switch 42 connected to the second transistor TR2 is connected to a constant voltage source Vcc via a pull-up resistor 45, and is also connected to the input port I1 of the microcomputer 30. When the safety switch 42 is in the OFF state, its terminal voltage is at the constant voltage Vcc, and when the safety switch 42 is in the ON state, its terminal voltage is at the ground voltage. Therefore, the microcomputer 30 can judge whether the safety switch 42 is in the ON state or the OFF state, by judging whether the level of the terminal voltage inputted to the input port I1 is high (Vcc) or low (the ground voltage).

The control system further comprises an alarm lamp 50 controlled by a transistor TR3. The base of the transistor TR3 is connected to the output port O3 of the microcomputer 30.

Figure 2:
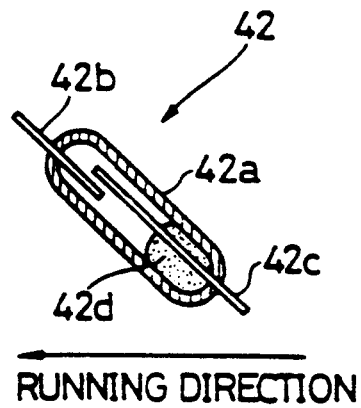
FIG. 2 is a cross-sectional view of one example of a safety switch.

FIG. 2 shows the safety switch 42 of the known type. More specifically, the safety switch 42 comprises an elongated container 42a, and a pair of elongated contacts 42b and 42c which extend respectively through the opposite ends of the container 42a. One end of the contacts 42b and 42c is disposed exteriorly of the container 42a, and the other end thereof are disposed interiorly of the container 42a and are disposed in opposed relation to each other in the vicinity of one end of the container 42a. Mercury 42d is contained in the container 42a. The container 42a is mounted on the vehicle in inclined relation to the direction of running of the vehicle. The mercury 42d is disposed at the other end portion of the container 42a. When the vehicle collides, the mercury 42d is moved or displaced obliquely upwardly (that is, toward the one end of the container 42a) by the inertia force. As a result, the two contacts 42a and 42b are electrically connected together through the mercury 42d, thereby turning on the safety switch 42.

Figure 3:
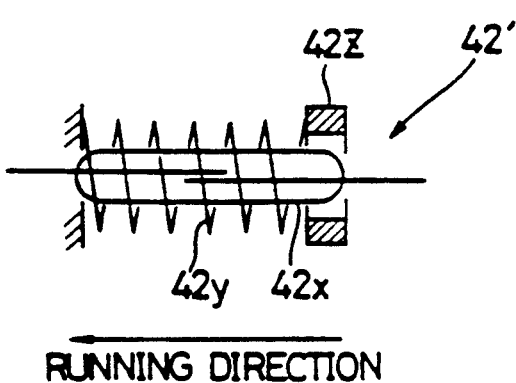
FIG. 3 is a schematic view of a modified safety switch.

FIG. 3 shows another known type of safety switch 42' which can be used instead of the above-mentioned safety switch 42. The safety switch 42' comprises an elongated reed switch 42x, a coil spring 42y provided around the reed switch 42x, and a ring-shaped magnet 42z provided at one end of the coil spring 42y. The reed switch 42x is disposed in parallel relation to the direction of running of the vehicle. When a collision occurs, the magnet 42z is moved along the axis of the reed switch 42x by the inertia force against the bias of the coil spring 42y, so that the reed switch 42x is turned on.

In the above construction, when the microcomputer 30 runs away, the ON-instructions signals for respectively turning on the transistors TR1 and TR2 may be outputted respectively from the output ports O1 and O2 of the microcomputer 30. However, unless the collision has occurred, the safety switch 42 remains in the OFF state, and therefore an inadvertent activation of the air bag can be prevented.

The microcomputer 30 in its normal operating condition executes a timer interrupt routine of FIG. 4 at a predetermined cycle. First, it is judged whether or not the first acceleration sensing circuit 21 is normal (Step 100). Namely, if the signal S1 from the first acceleration sensing circuit 21 is kept at the upper limit (5 V) or the lower limit (0 V) for a predetermined time period, it is judged that there exists a malfunction such as a wire cutting and a short-circuiting. Then, similarly, based on the signal S2 from the second acceleration sensing circuit 22, it is judged whether the second acceleration sensing circuit 22 is normal (Step 101).

If the results in Steps 100 and 101 are both "YES", the deceleration represented by the signal S1 from the first acceleration sensing circuit 21 is integrated (Step 102). Namely, the deceleration S1 inputted at this time is added to a first integral value $\Delta v1$ calculated at a preceding cycle of the routine. Although not shown, if the deceleration is below a certain level or if the acceleration is detected, the first integral value $\Delta v1$ is calculated by subtracting a necessary value from the precedingly-calculated first integral value $\Delta v1$. Similarly, the deceleration S2 from the second acceleration sensing circuit 22 is integrated to obtain $\Delta v2$ (Step 103).

Then, it is judged whether or not the integral values $\Delta v1$ and $\Delta v2$ are greater than a threshold level Th (Steps 104 and 105). If at least one of the integral values $\Delta v1$ and $\Delta v2$ is less than the threshold level Th, the program is returned to a main routine.

When the acceleration sensing circuits 21 and 22 are normal, and also when no collision has occurred, the above Steps 100 to 105 are executed each time the timer interrupt is made.

If it is judged in Steps 104 and 105 that the integral values $\Delta v1$ and $\Delta v2$ are both above the threshold level Th (that is, it is judged that a collision has occurred), the first and second transistors TR1 and TR2 are both turned on (Step 106). Namely, the ON-instruction signal of a low level is outputted from the output port O1, and the ON-instruction signal of a high level is outputted from the output port O2. The safety switch 42 is turned on under collision conditions less severe than the collision conditions set by the microcomputer 30, and therefore when the microcomputer 30 judges the occurrence of the collision, the safety switch 42 is in the ON state. As a result, the squib 10 is ignited to expand the air bag.

As described above, since the microcomputer 30 effects the calculations based on the decelerations fed respectively from the first and second acceleration sensing circuits 21 and 22, the collision judgment can be effected in a highly precise manner.

If it is judged in Step 100 that the first acceleration sensing circuit 21 is subjected to a malfunction, or if it is judged in Step 101 that the second acceleration sensing circuit 22 is subjected to a malfunction, the high-level signal is fed from the output port O3 to the transistor TR3, so that the alarm lamp 50 is turned on (Step 107).

Then, it is again judged whether or not the first acceleration sensing circuit 21 is normal (Step 108). If the result is "YES" (that is, it is judged that the first acceleration sensing circuit 21 is normal and that the second acceleration sensing circuit 22 is subjected to a malfunction), the first integral value $\Delta v1$ is calculated based on the deceleration S1 from the first acceleration sensing circuit 21 (Step 109), and it is judged whether or not this first integral value $\Delta v1$ exceeds the threshold level Th (that is, whether or not the collision has occurred) (Step 110). If the result is "YES", it is judged whether or not the safety switch 42 is in the ON state (Step 111). If the result is "YES", the transistors TR1 and TR2 are turned on to ignite the squib 10 (Step 112).

If either of the results of Steps 110 and 111 is "NO", Step 112 is skipped, and the program is returned to the main routine.

If it is judged in Step 108 that the first acceleration sensing circuit 21 is subjected to a malfunction, it is again judged in Step 113 whether or not the second acceleration sensing circuit 22 is normal. If the result is "YES", the calculation of the second integral value $\Delta v2$ (Step 114), the collision judgment based on the second integral value $\Delta v2$ (Step 115), the judgment of the state of the safety switch 42 (Step 116), and the turning-on of the transistors TR1 and TR2 (Step 117) are carried out. These Steps are similar to the above-mentioned Steps 109 to 112, respectively, and therefore detailed explanation thereof is omitted.

As described above, if it is judged that one of the two acceleration sensing circuits 21 and 22 is subjected to a malfunction and that the other is normal, the collision judgment is carried out based on the deceleration signal from the normal acceleration sensing circuit. By doing so, a high-precision collision judgment can be carried out, though it is slightly inferior in accuracy to the collision judgment based on the deceleration signals S1 and S2 from the two acceleration sensing circuits 21 and 22. In view of the fact that the collision judgment, based on one of the decelerations detected by the acceleration sensing circuits 21 and 22, is slightly inferior in accuracy, the transistors TR1 and TR2 are turned on only when the safety switch 42 is in the ON state (see Steps 111 and 116). The reason for this will now be described in detail. When the transistors TR1 and TR2 are turned on in the OFF state of the safety switch 42, the electric current necessary for the ignition of the squib 10 is not supplied to the squib 10, but the electric charge of the energy reservoir flows or escapes to the constant voltage source Vcc via the transistors TR1 and TR2, the squib 10 and the pull-up resistor 45. This difficulty can be prevented by turning on the transistors TR1 and TR2 only when confirming that the safety switch 42 is in the ON state.

If the result in Step 113 is "NO" (that is, it is judged that the two acceleration sensing circuits 21 and 22 are both subjected to a malfunction), it is judged whether or not the safety switch 42 is in the ON state (Step 118). If the result is "YES", it is judged whether or not the time period Ton of the turning-on of the safety switch 42 exceeds a predetermined time period (Step 119). If either of the results of Steps 118 and 119 is "NO", the program is returned to the main routine. If the results of Steps 118 and 119 are both "YES", the transistors TR1 and TR2 are turned on (Step 120). By doing so, even if the two acceleration sensing circuits 21 and 22 are both subjected to a malfunction, the air bag can be expanded to thereby ensure the safety of the passengers.

The passengers can realize the malfunction of the acceleration sensing circuits 21 and 22 through the lighting of the alarm lamp 50, and a necessary repair must be made soon. Even if a collision occurs before such repair is made, the passenger's safety can be assured by the above procedure.

The air bag is activated only when the ON-state of the safety switch 42 continues for the predetermined time period (Step 119), and therefore even when a large deceleration develops for a moment, for example, during the running of the vehicle on a bad or rugged road, so that the safety switch 42 is turned on, an inadvertent activation of the air bag can be prevented.

The present invention is not limited to the above embodiments, and various modifications can be made. For example, the control system may use one acceleration sensing circuit, and one transistor.

In the case where a plurality of acceleration sensing circuits are used, when the occurrence of a collision is judged based on the deceleration signal from one normal acceleration sensing circuit, the vehicle safety device may be activated regardless of the calculations based on the deceleration signals from the other acceleration sensing circuits. In the case where more than two acceleration sensing circuits are used, the calculation may be made based on the deceleration signals from all of the normal acceleration sensing circuits, so that the collision may be decided by majority.

The malfunction judgment may be made only at the time of the power-on. In this case, it is judged in Steps 100, 101, 108 and 113 whether or not a malfunction flag is set.

The control system of the present invention can be applied not only to the air bag but also to a seat belt-tightening device.

What is claimed is:

1. A control system for a vehicle safety device comprising:
    (a) a drive circuit for said vehicle safety device, said drive circuit including main switching means and a safety switch which is turned on by an inertia force produced at the time of a collision of the vehicle, and said vehicle safety device being activated when said main switching means and said safety switch are both turned on;
    (b) acceleration sensing means for detecting deceleration of the vehicle, said acceleration sensing means outputting a voltage signal corresponding to the deceleration;
    (c) analog-to-digital converting means for converting the voltage signal from said acceleration sensing means to a digital deceleration signal; and
    (d) a microcomputer comprising (i) integrating means for integrating the deceleration signal from said analog-to-digital converting means to obtain an integral value; (ii) first ON-instruction signal outputting means for judging whether or not the integral value is beyond a threshold level and for outputting a first ON-instruction signal to said main switching means when said first ON-instruction signal outputting means judges that the integral value is beyond a threshold level; (iii) malfunction judgement means for judging whether or not said acceleration sensing means is subjected to a malfunction (iv) switch state judgment means for judging whether said safety switch is in the ON state or the OFF state; and (v) second ON-instruction signal outputting means for outputting a second ON-instruction signal to said main switching means when said malfunction judgment means judges that said acceleration sensing means is subjected to a malfunction and at the same time when said switch state judgment means judges that said safety switch is in the ON state.

2. A control system according to claim 1, in which said acceleration sensing means comprises a plurality of acceleration sensing circuits, said malfunction judgment means of said microcomputer judging whether or not each of said plurality of acceleration sensing circuit is subjected to a malfunction, said first ON-signal instruction outputting means judging, based on the deceleration signals fed respectively from those of said acceleration sensing circuits which are decided by said malfunction judgment means to be free from any malfunction, whether or not a collision has occurred, and said second ON-instruction signal outputting means outputting said second ON-instruction signal when said malfunction judgment means judges that all of said acceleration sensing circuits are subjected to a malfunction and at the same time when said switch state judgment means judges that said safety switch is in the ON state.

3. A control system according to claim 2, in which said acceleration sensing means comprises a pair of acceleration sensing circuits; if said malfunction judgment means judges that one of said two acceleration sensing circuits is subjected to a malfunction and that the other acceleration sensing circuit is normal, said first ON-instruction signal outputting means outputting said first ON-instruction signal when said first ON-instruction signal outputting means judges, based on the deceleration signal fed from said other acceleration sensing circuit, that the collision has occurred, and at the same time when said switch state judgment means judges that said safety switch is in the ON state.

4. A control system according to claim 1, in which said safety switch is connected between a squib for activating said vehicle safety device and a ground potential, one terminal of said safety switch connected to said squib being connected to an input port of said microcomputer, and also being supplied with a constant voltage from a constant voltage source, and said microcomputer judging that said safety switch is in the ON state when the voltage at said terminal of said safety switch drops to the ground potential.

5. A control system according to claim 1, in which said switch state judgment means of said microcomputer judges that said safety switch is in the ON state when the ON state of said safety switch continues for a predetermined time period.

* * * * *